Nov. 5, 1946.  V. E. PRATT ET AL  2,410,611
FEEDING APPARATUS
Filed May 15, 1945
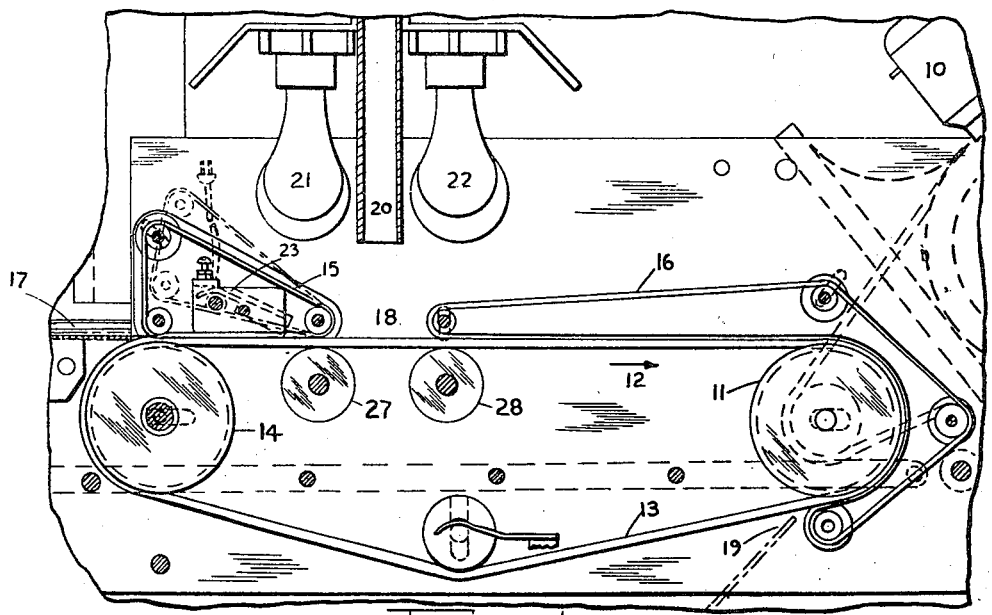
Fig. 1
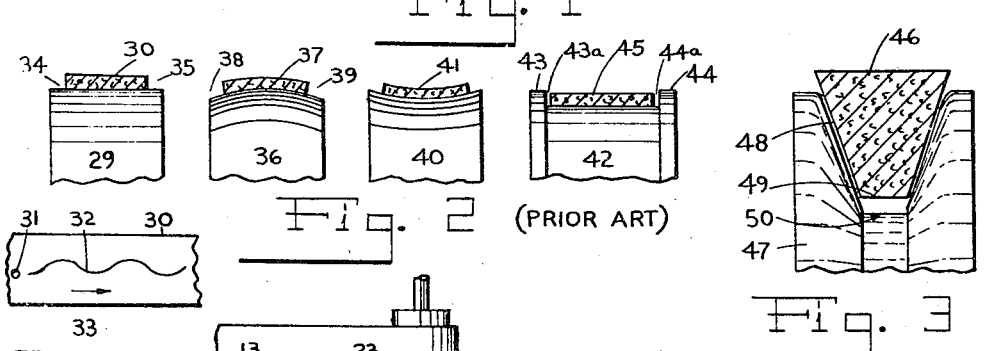
Fig. 2 (PRIOR ART)
Fig. 2A
Fig. 3
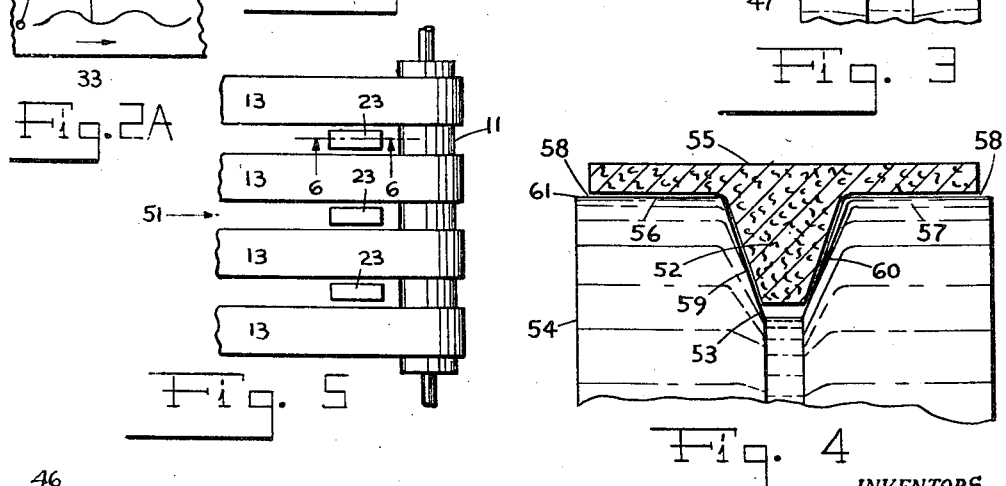
Fig. 5
Fig. 4
Fig. 7
Fig. 6
INVENTORS.
VERNEUR E. PRATT
GEORGE F. GRAY
BY
Van Deventer & Grier
ATTORNEYS Patented Nov. 5, 1946

2,410,611

UNITED STATES PATENT OFFICE 2,410,611

FEEDING APPARATUS

Verneur E. Pratt and George F. Gray, Norwalk, Conn.

Application May 15, 1945, Serial No. 593,892

8 Claims. (Cl. 271—45)

This invention relates to feeding apparatus which may be used for any purpose for which such apparatus having the herein described characteristics is suitable.

The invention is particularly useful in connection with document feeders as used in photographic devices such, for example, as that shown in the co-pending application Serial Number 507,939, filed on October 28, 1943, and entitled, "Photographic devices and method of operating the same."

By way of illustrating a preferred embodiment of the instant invention, it will be illustrated as applied to microfilm apparatus such as shown in the aforesaid application which discloses a photographic camera of the flow type designed to photograph documents of random size on film commonly called microfilm.

In such cameras a reduction of fifteen diameters or more is common which necessitates close registry and very accurate operation of all parts of the camera including the feeding mechanism which positions the documents or "copy" to be photographed in the field of the lens. Said copending application discloses a certain arrangement of belts for this purpose.

Microfilm made in a camera as disclosed in the aforesaid co-pending application is often afterward viewed by throwing a magnified image of the film on a screen, and naturally any imperfections that exist in the film are greatly magnified in the enlarged image.

It has been determined that with known forms of feeders using belts a lateral movement of the belts, and consequently of the copy fed thereby, occurs. This motion can in general be described as a weaving motion and occurs at a right angle to the direction of the movement of the flow of the copy. This weaving motion is hereinafter more fully described. The effect produced by it is commonly termed in the art as a "wiggle." This effect appears in the photograph of the magnified, or blown up, image as a wavy distortion particularly objectionable at high reductions as it causes blurring and other undesirable qualities.

Another objection to any weaving motion in a feeder for microfilm apparatus is that the weaving motion causes a vibration in the mechanism.

An object of the present invention is to provide a feeder which eliminates the foregoing defects and which has certain other advantages more fully hereinafter set forth. While this improved feeder and the improved belt for use therewith is here disclosed as applied to a camera of the type described, it will be understood that the feeder and belt can be applied to any other mechanism or device in which it is desirable to have the feeder free from weaving motion so that it will feed in a straight line in the direction of its motion and without setting up vibrations in the mechanism to which it is applied.

In the accompanying drawing:

Figure 1 is a side view partly in section through a photographic device (a flow camera) as more fully described in the aforesaid co-pending application to which the instant invention is applied;

Figure 2 is a diagram showing prior art belts in order to distinguish same from the instant invention;

Figure 2A is a diagram showing what is meant herein by weaving motion;

Figure 3 is a cross-sectional view of a belt embodying the invention;

Figure 4 is a cross-sectional view of a modification of the belt shown in Figure 3;

Figure 5 is a plan view of a feeder embodying the belts shown in Figures 3 and 4;

Figure 6 is a view of a contact device used with such feeders and more fully described in the copending application aforementioned; and Figure 7 is a view of a belt, the outer surface of which is formed of a series of upstanding ribs.

Referring to Figure 1, which is substantially a duplicate of one of the figures in the aforesaid co-pending application, a suitable driving motor 10 drives a pulley 11 which supports and drives in the direction of the arrow 12 a plurality of endless belts 13, which are supported by another pulley 14. A pair of idler belts 15, 16 are positioned above the main belts 13 so that a document fed into the device on the slide 17 will first be grasped between belts 13 and 15, carried across the opening 18, which is the field of the lens, and then grasped by belts 16 and 13, carried around the pulley 14 and discharged at the point 19.

A light tunnel 20 is provided and the camera and film feeding mechanism are positioned above this light tunnel so that the camera lens is pointed downwardly to view the copy exposed in the space 18 below the light tunnel.

The usual lamps 21, 22 are provided for illuminating the copy in the space 18.

One or more contact mechanisms 23 are provided having the downwardly extending tongues 24 lying between the belts 13. When a piece of copy fed into the device engages one of the tongues 24 the contact portion 25 thereof is moved into electrical contact with the cross bar 26, and through an electrical circuit connected to 25 and 26 the operation of the apparatus is controlled, all as described in the aforesaid co-pending application.

The location of the contact mechanism 23 between the belts 13 is shown in Figure 5, and a sectional view of the contact mechanism is more fully shown in Figure 6.

A pair of guide rollers 27, 28, Figure 1, may be employed immediately below the space 18 to support the belts 13 in order to prevent any motion in a vertical plane.

Figure 2 shows some of the prior art belts that have been used in connection with feeding mechanisms of the general type just described in connection with Figure 1. Numeral 29 indicates a flat pulley supporting a flat belt 30. When such belts are used, weaving motion occurs; that is to say, any theoretical point such as the point 31 on the belt 30, Figure 2A, will follow a sinuous line 32, the surface of the belt weaving or wiggling laterally as the belt is moved in the direction of its length indicated by the arrow 33. In other words, the belt 30 in Figure 2 will first tend to move towards the side 34 of the pulley and then towards the side 35.

This oscillating or transverse weaving motion naturally displaces any copy, such as a letter, for example, that is carried through the device on the belt 30, and any given letter or point in this reading matter, as indicated by the point 31, Figure 2A, will appear more or less blurred on the negative microfilm.

It will be understood that in connection with this weaving motion the actual movement is very slight. It may not be perceptible to the naked eye but is perceived by the camera, and in order to produce perfect negatives it must be eliminated.

In order to eliminate this weaving motion as much as possible, the driving pulley is sometimes made convex as shown at 36, Figure 2, whereupon the belt 37 thereon assumes a convex form to conform to the contour of the pulley, but here again the belt tends to move from one side of the pulley to the other; for example, first over towards 38 and then towards 39, thus giving the belt a weaving motion.

Sometimes concave pulleys, as shown at 40, Figure 2, are employed whereupon the belt 41 assumes a concave form to conform to the pulley, but here again the belt weaves from side to side and does not move in a straight path parallel to the direction in which it is driven.

In some cases an attempt is made to use a pulley 42 having the upstanding edges 43, 44 between which the belt 45 is placed, and these edges are relied upon to keep the belt from having any weaving motion. It will be apparent however that first the upstanding edges 43, 44 are objectionable in a copy feeder because they engage the copy particularly in the multiple belt arrangement having the belts 13, 16 as described in connection with Figure 1, where the copy is fed around the right-hand portion of the driving pulley 11. Or, if the belt 45 is made thick enough so that the upstanding edges of the pulleys 43, 44 are below the upper surface of the belt, then it is difficult to make the belt sufficiently flexible.

Secondly, it is impossible to prevent weaving if any space at all is left between the upstanding edges, or flanges, 43, 44 and the belt 45. These spaces are shown at 43a and 44a. Some space must be left or the belt will over-ride the flanges or buckle in the space between them. To make a belt that will fit between the flanges exactly and still have some of its upper surface extending beyond the flanges is exceedingly difficult, if not impossible, and is not attempted in practice where the belt is operated at other than a very slow speed. Such a construction necessitates a precision of accuracy in fitting the belts to the flange pulleys, which is not obtainable in commercial practice.

In Figure 3 is shown an improved belt suitable for use in the improved feeder mechanism herein disclosed. In this figure the belt is of substantially V-shaped cross-section and has an outer surface shown at 46 adapted to support the copy to be fed into the apparatus. By outer surface is meant either the flat surface of the belt as shown in Figure 3, or the tops of any ribs, spots, or other configurations that run lengthwise of the belt, as more particularly shown in Figure 7 where the line 46 indicates the "outer surface" of the belt, the upper body portion of which is shown at 46a. It will be noted that this belt 46a has a series of upstanding ribs, such as 46b, which run lengthwise of the belt, and these form the "outer surface of the belt" as that term is used herein.

The belt 46, Figure 3, is supported on suitable means, such as the pulley 47 for conjointly supporting and moving the belt. Obviously pulleys like 47 could be used at 27, 28, Figure 1, where the said pulleys merely support the belt, without moving it. Or, these pulleys 47 may be the pulleys 11, 14 of Figure 1. The belt 46 has a portion 48 below its outer surface which, of course, extends lengthwise of the belt and which engages the V-groove in the pulley 47. It will be noted, however, that the lower end 49 of the belt 48 does not make contact on the bottom 50 of the V-groove in the pulley, the arrangement being such that it is only the sides of the V-belt that are in contact with the sides of the pulley whereby lateral or weaving motion of said belt is prevented, and said belt is thereby adapted to carry copy placed on the outer surface thereon in a straight path parallel to the direction of the movement of the belt.

A plurality of belts 46 may be mounted in side-by-side relation same as the belts 13 in Figure 5 in which case their outer surfaces 46 are horizontally aligned so that they form a bed or support for the copy to be fed to the apparatus with which the feeder is used. When so arranged, lateral motion of each one of said belts is prevented during the movement thereof, and said belts are maintained parallel and adapted to carry copy placed thereon in a straight path parallel to the direction of movement of said belts, which is in the direction of the arrow 51.

In Figure 4 is shown an alternate form of belt which for some purposes has certain advantages over the belts shown in Figure 3. In Figure 4 the belt has a substantially V-shaped body portion shown at 52 which fits the corresponding groove 53 in the pulley 54 in all respects same as the belt shown in Figure 3. But, the belt of Figure 4 has a top portion 55 which extends horizontally across the top of the V-section of the belt and outwardly across the adjacent portions 56, 57 of the pulley. However, the belt does not touch the lateral portions 56, 57 of the pulley being separated therefrom as shown at 58 so that the only portion of the belt in contact with the pulley is the side portions of the V of the belt along the sides 59, 60 of the V-groove in the pulley.

By this arrangement a portion of the V of the belt is engaged and held in the groove in the pulley without lateral play therein, while the top portion 55 of the belt is supported by the V- shaped portion thereof out of contact with the pulley to form a copy feeder adapted to carry copy placed thereon in a straight path parallel to the direction of movement of the belt. Either of the belts Figures 3 or 4 lend themselves to assembly into a feeder unit by providing a pair of pulleys, such as 11 and 14 Figure 1, placing a plurality of endless belts either Figures 3 or 4, or said pulleys and said belts being arranged parallel and laterally spaced apart as shown in Figure 5 to provide spaces therebetween for contact mechanisms such as shown in Figure 6. These belts either Figures 3 or 4 have portions which are substantially V-shaped in cross-section as shown and which extend into and are seated in corresponding grooves in the said pulleys with the bottom of the V-shaped sections of the belts out of contact with the bottom of the V-grooves in the pulleys, so that any inequality in the depth of the V-shaped section of the belts or in the depth in the V's in the pulleys will not cause the belts to shift vertically.

It will also be seen that the belts extend upward beyond the peripheries of the pulleys; that is to say, referring to Figure 4, the periphery of the pulley is shown at 61 and the edges of the belt lie free above it so that the belts have a free portion outside the pulley, but the belts are prevented from weaving motion by engagement with the side walls only of the V-grooves in the pulleys. This permits the outer surfaces of the belts to act as a copy feeder without lateral movement of said belts when same are moved in the direction of their length.

The belts Figures 3 and 4 may be constructed in any suitable manner, and in general the specifications for the width of the belt and the thickness of same from the top outer surface to the bottom of the V may follow standard practice in respect to the angle of the sloping sides of the V-belt, and the corresponding pulley grooves to fit it. As the dimensions and characteristics of these belts will depend largely on the diameter of the pulleys, and as the requirements for forming the V-portion of the belt and the V-pulley grooves is well understood, no attempt is here made to give them in detail.

It will be seen that this invention is particularly useful when using a plurality of relatively narrow belts—say one inch wide or less, as it enables a plurality of such belts to be used side by side with spaces therebetween to accommodate the contact devices such as that shown in Figure 6. Such devices cannot be easily used with relatively wide belts which have known objections when used in feeders in microfilm apparatus.

What is claimed is:

1. A feeder for microfilm apparatus including a belt having an outer surface adapted to support material to be fed, means for conjointly supporting and moving said belt, said belt having a portion below the surface thereof substantially narrower than and extending lengthwise of the belt and engaging said means whereby weaving or lateral motion of said belt is prevented and said belt is thereby adapted to carry material placed thereon in a straight path parallel to the direction of movement of said belt and whereby material on said belt may be subjected to a photographic process while carried thereby free from contact with said supporting means.

2. A feeder for microfilm apparatus including a plurality of parallel belts in side-by-side relation and having their outer surfaces horizontally aligned to support copy to be fed to said apparatus, and means for conjointly supporting and moving said belts, each of said belts having a portion extending below the surface thereof substantially narrower and extending lengthwise of the belt and engaging said means whereby lateral motion of said belt is prevented during movement and said belts are thereby maintained parallel and adapted to carry copy placed thereon in a straight path parallel to the direction of movement of said belts to be subjected to a photographic process while carried thereby free from contact with said supporting means.

3. A feeder for microfilm apparatus including a plurality of V-belts having their upper surfaces horizontally aligned and substantially wider than the V-section thereof, said upper surfaces being adapted to support copy to be fed to said apparatus, means for conjointly supporting and moving said belts, said belts having a portion of their V's engaging corresponding grooves in said means without relative lateral play, whereby lateral motion of said belts is prevented and said belts are thereby adapted to carry copy placed thereon in a straight path parallel to the direction of movement of the belts without deviating laterally to be subjected to a photographic process while carried thereby free from contact with said supporting means.

4. A feeder for microfilm apparatus including a belt having a substantially V-shaped body portion and a top portion extending horizontally across the top of the V and outwardly laterally beyond the upwardly extending legs thereof to form a support for copy to be fed to said apparatus, and means for conjointly supporting and moving said belt, a portion of the V of said belt being engaged and held in a corresponding groove in said means without lateral play therein while the said top portion is supported by said V-shaped portion out of contact with said means to form a copy feeder adapted to carry copy placed thereon in a straight path parallel to the direction of movement of said belt to be subject to a photographic process while carried thereby free from contact with said supporting means.

5. A feeder for microfilm apparatus including a pair of rotatable pulleys each having a plurality of V-grooves therein, a plurality of endless belts supported on said pulleys said belts being parallel and laterally spaced apart to provide spaces therebetween, said belts being substantially V-shaped in cross section and extending into and being seated in said grooves in said pulleys with the bottom of their V-shaped sections out of contact with the bottom of the V-grooves in the pulleys, said belts extending upwards above the peripheries of the pulleys to provide a free portion outside said pulleys, said belts being prevented from weaving movement by engagement with the side walls of said V-grooves only whereby the outer surfaces of said belts may act as a copy feeder without lateral movement of said belts when same are moved in the direction of their length and whereby material on said belt may be subjected to a photographic process while carried thereby free from contact with said pulleys.

6. A feeder for microfilm apparatus including a pair of rotatable pulleys each having a plurality of V-grooves therein, a plurality of endless belts supported by said pulleys, said belts being parallel and laterally spaced apart to provide spaces therebetween, said belts having copy-carrying surfaces horizontally aligned to provide a copy feeder adapted to feed copy in the direction of movement of said belts by said pulleys, each of said belts having copy-carrying portions extending laterally above said grooves and out of contact with the underlying portions of the pulleys, each of said belts having a V-portion substantially narrower than said extending portions and positioned in one of said V-grooves in each of said pulleys, said belts being prevented from moving laterally by said V-portions therein when moved by the rotation of said pulleys on which said belts are supported and whereby material on said belt may be subjected to a photographic process while carried thereby free from contact with said pulleys.

7. A feeder for microfilm apparatus including a plurality of parallel feeder belts in side-by-side relation and having their outer surfaces horizontally aligned to support material to be fed to said apparatus, and means for conjointly supporting and moving said belts, each of said belts having a portion extending below the surface thereof, substantially narrower than said surface and extending lengthwise of the belt and engaging said means, whereby lateral motion of said belt is prevented during movement, and said belts are thereby maintained parallel and adapted to carry copy placed thereon in a straight path parallel to the direction of movement of said belts, and a plurality of parallel idler belts in side-by-side relation and having their outer surfaces overlying the outer surfaces of said feeder belts, each of said idler belts having a guide portion extending below the surface thereof and lengthwise of the belt, means for supporting said idler belts, said last belts having their guide portions engaging said means whereby lateral movement of said idler belts is prevented during the movement thereof and said idler belts are thereby maintained parallel to said feeder belts, said feeder and idler belts being adapted to grip material therebetween whereby said material may be subjected to a photographic process while carried thereby, said material being free from contact with said supporting means.

8. A feeder for microfilm apparatus including a belt having an outer surface adapted to support material to be fed past the field of view of a lens, means for conjointly supporting and moving said belt, said belt having a portion below the surface thereof substantially narrower than and extending lengthwise of the belt and engaging said means whereby weaving or lateral motion of said belt and its extremities is prevented, and means located below said belt and engaging said portion below the surface thereof and located immediately adjacent that portion of said belt spanning the field of view of said lens to prevent weaving or lateral motion of said belt in said field of view, said belt being adapted to carry material thereon in a straight line parallel to the direction of movement of said belt to subject said material to a photographic process while carried on said belt.

VERNEUR E. PRATT.
GEORGE F. GRAY.